United States Patent [19]
Imai

[11] 4,099,843
[45] Jul. 11, 1978

[54] COMPACT LARGE-APERTURE PHOTOGRAPHIC LENS SYSTEM WITH LONG BACK FOCAL LENGTH

[75] Inventor: Toshihiro Imai, Hachiouji, Japan
[73] Assignee: Olympus Optical Co., Ltd., Japan
[21] Appl. No.: 773,407
[22] Filed: Mar. 1, 1977
[30] Foreign Application Priority Data
Mar. 2, 1976 [JP] Japan .................. 51-22482
[51] Int. Cl.² .............................. G02B 11/32
[52] U.S. Cl. .................... 350/176; 350/215
[58] Field of Search .................. 350/215, 176
[56] References Cited
U.S. PATENT DOCUMENTS

| 3,552,829 | 1/1971 | Marquardt | 350/215 |
| 3,738,736 | 6/1973 | Shimizu | 350/215 |
| 3,743,387 | 7/1973 | Nakagawa | 350/215 |
| 3,851,953 | 12/1974 | Nakagawa | 350/215 |
| 3,984,155 | 10/1976 | Nakagawa | 350/215 |

*Primary Examiner*—Conrad J. Clark
*Attorney, Agent, or Firm*—Cushman, Darby & Cushman

[57] ABSTRACT

A compact large-aperture photographic lens system having six-component seven-element lens configuration and comprising a first, second, third, fourth, fifth and sixth lens components, in which the first and second lens components are positive meniscus lenses, the third lens component is a negative meniscus lens, the fourth lens component is a cemented meniscus doublet, the fifth lens component is a positive meniscus lens and the sixth lens component is a positive lens, the compact large-aperture photographic lens having a short overall length and long back focal length.

7 Claims, 23 Drawing Figures

FIG. 1

FIG. 2A
SPHERICAL ABERRATION

FIG. 2B
ASTIGMATISM

FIG. 2C
DISTORTION

FIG. 3A
SPHERICAL ABERRATION
F1.2
g
d
-1 0 1

FIG. 3B
ASTIGMATISM
23°
m
16.4°
s
-1 0 1

FIG. 3C
DISTORTION
-2 2 %

FIG. 4A
SPHERICAL ABERRATION
F1.2
d g
-1 0 1

FIG. 4B
ASTIGMATISM
23°
s m
16.4°
-1 0 1

FIG. 4C
DISTORTION
-2 2 %

FIG. 5A  FIG. 5B  FIG. 5C

SPHERICAL ABERRATION

ASTIGMATISM

DISTORTION

COMPACT LARGE-APERTURE PHOTOGRAPHIC LENS SYSTEM WITH LONG BACK FOCAL LENGTH

BACKGROUND OF THE INVENTION (a) Field of the Invention

The present invention relates to a compact large-aperture photographic lens system and, more particularly, to a compact large-aperture photographic lens system for which the back focal length is long, intensity of light in the marginal portion is high and aperture ratio is F1.2.

(b) Description of the Prior Art

A Gauss-type photographic lens systems with focal length of 50 mm, various lens systems are known. For most of them, however, the aperture ratio is about F1.4. To reduce the weight of camera, it is necessary to obtain a compact lens system with short overall length. Moreover, it is generally required to make the back focal length long.

However, compact photographic lens systems with large aperture ratio and long back focal length are not yet known so much.

SUMMARY OF THE INVENTION

It is, therefore, a primary object of the present invention to provide a large-aperture Gauss-type photographic lens system for which the overall length is short, intensity of light in the marginal portion is high, aperture ratio is F1.2 and back focal length is long.

Figure 1:
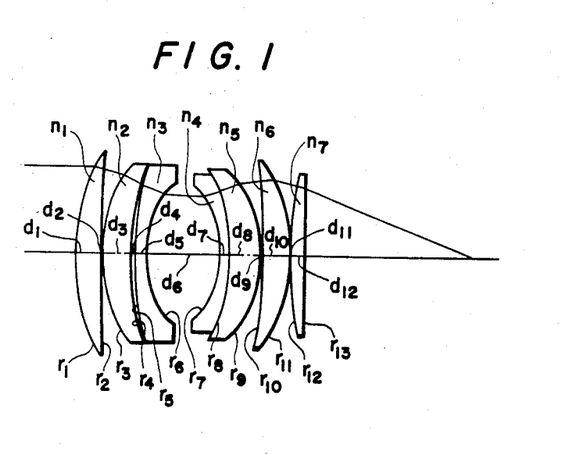
FIG. 1 shows a sectional view of the compact large-aperture photographic lens system according to the present invention.
Figure 2A:
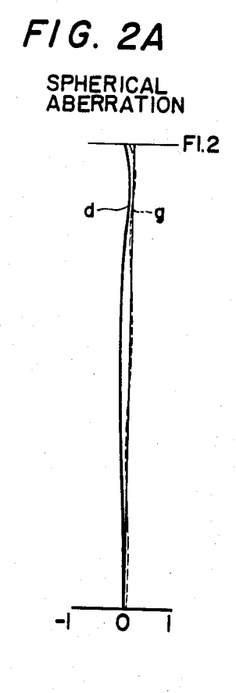
FIGS. 2A, 2B and 2C respectively show graphs illustrating aberration curves of Embodiment 1.
Figure 2B:
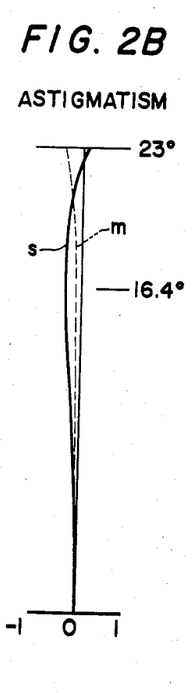
Figure 2C:
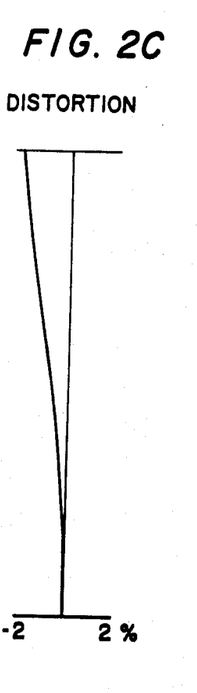
Figure 3A:
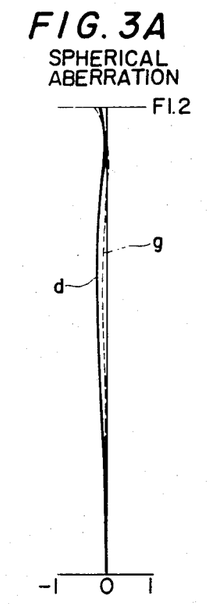
FIGS. 3A, 3B and 3C respectively show graphs illustrating aberration curves of Embodiment 2.
Figure 3B:
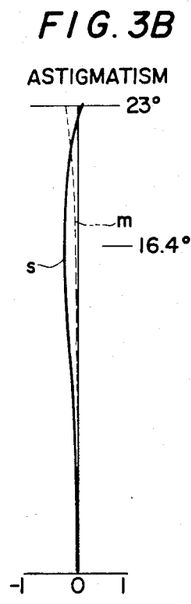
Figure 3C:
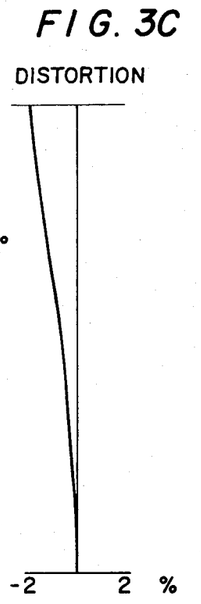
Figure 4A:
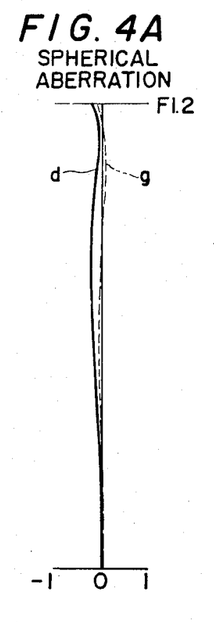
FIGS. 4A, 4B and 4C respectively show graphs illustrating aberration curves of Embodiment 3.
Figure 4B:
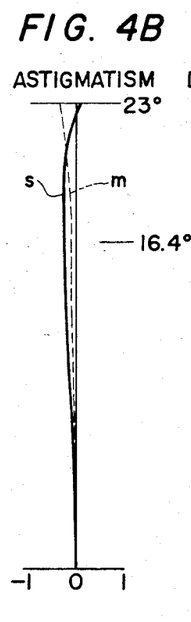
Figure 4C:
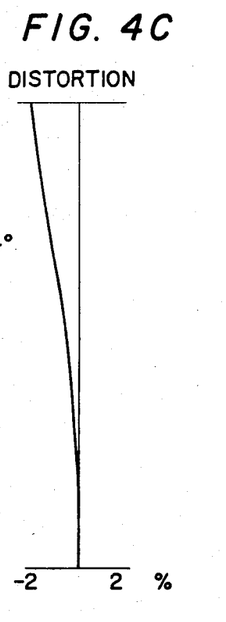
Figure 5A:
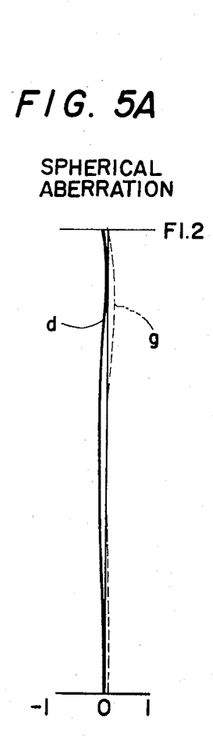
FIGS. 5A, 5B and 5C respectively show graphs illustrating aberration curves of Embodiment 4.
Figures 5B, 5C:
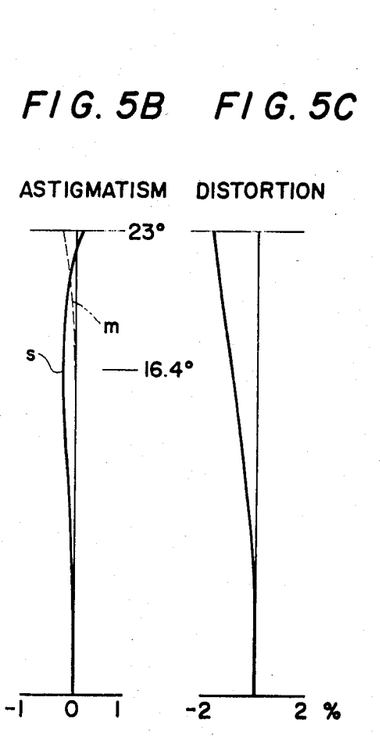
Figure 6A:
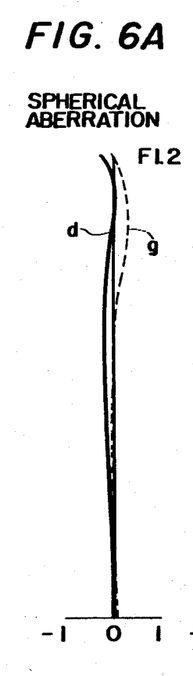
FIGS. 6A, 6B, 6C, 6D and 6E respectively show graphs illustrating aberration curves of Embodiment 5.
Figure 6B:
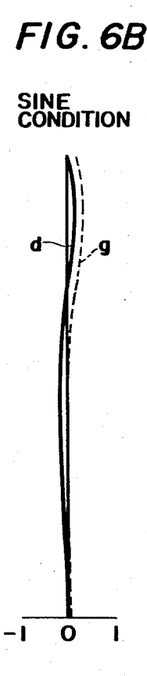
Figure 6C:
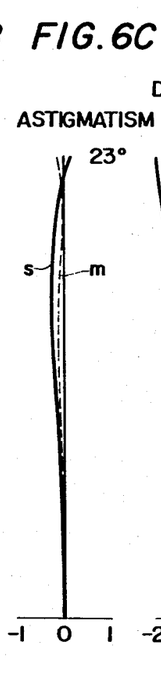
Figure 6D:
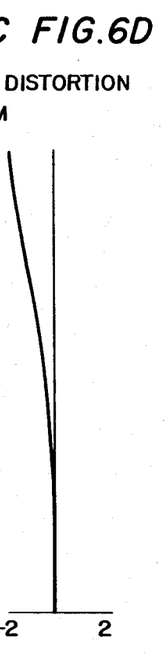
Figure 6E:
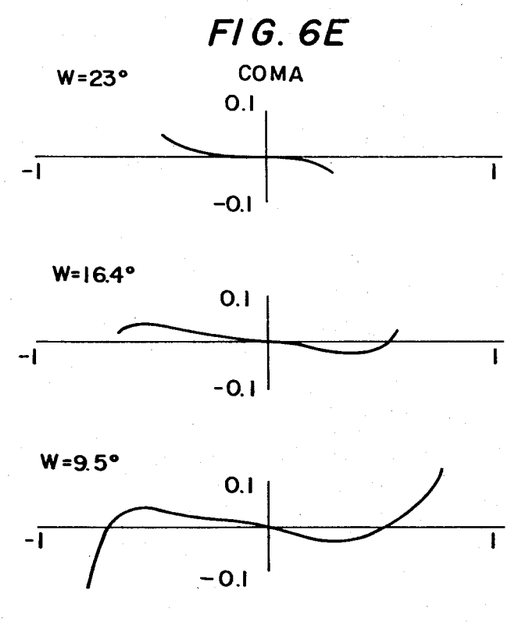
Figure 7A:
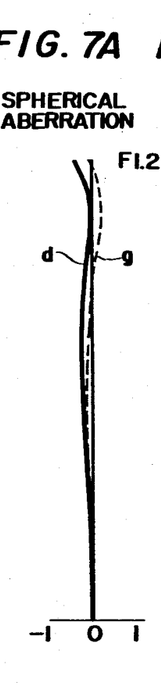
FIGS. 7A, 7B, 7C, 7D and 7E respectively show graphs illustrating aberration curves of Embodiment 6.
Figure 7B:
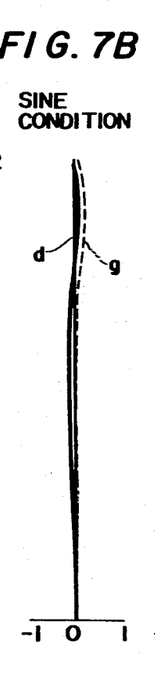
Figure 7C:
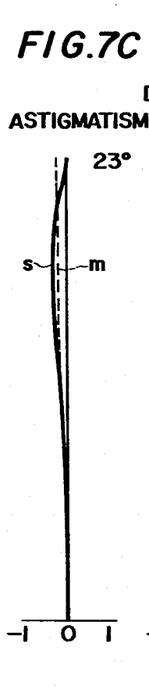
Figure 7D:
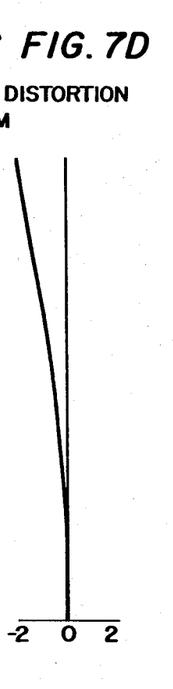
Figure 7E:
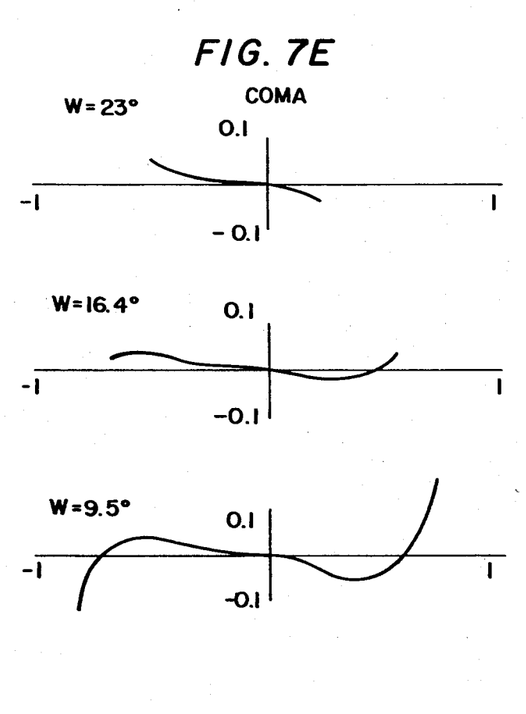

As shown in FIG. 1, the compact large-aperture photographic lens system with long back focal length according to the present invention has six-component seven-element lens configuration and comprises a first, second, third, fourth, fifth and sixth lens components. Out of them, the first lens component is a positive meniscus lens, the second lens component is a positive meniscus lens, the third lens component is a negative meniscus lens, the fourth lens component is a cemented meniscus doublet, the fifth lens component is a positive meniscus lens and the sixth lens component is a positive lens. The stop of the lens system is arranged between the third and fourth lens components. Besides, the compact large-aperture photographic lens system according to the present invention satisfies the conditions given below when reference symbol L represent the overall length of the lens system, reference symbol $r_4$ represents the radius of curvature of the surface of the image side of the second lens component, reference symbol $r_5$ represents the radius curvature of the surface on the object side of the third lens component, reference symbol $r_8$ represents the radius of curvature of the cemented surface of the fourth lens component, reference symbols $d_3$ and $d_5$ respectively represent thicknesses of the second and third lens components, reference symbols $d_7$ and $d_8$ respectively represent thicknesses of respective lenses constituting the fourth lens component, reference symbol $d_4$ represents the airspace between the second and third lens components, reference symbols $n_1, n_2, n_3, n_4, n_5, n_6$ and $n_7$ respectively represent refractive indices of respective lenses, referency symbols $v_4$ and $v_5$ respectively represent Abbe's numbers of repective lenses constituting the fourth lens component, reference symbols $v_6$ and $v_7$ respectively represent Abbe's numbers of the fifth and sixth lens components, reference symbol $f_{23}$ represents the total focal length of the second and third lens components, reference symbol $f_{45}$ represents the focal length of the fourth lens component and reference symbol $f$ represents the focal length of the lens system as a whole.

$$L/f < 1 \ (L = \Sigma d) \quad (1)$$

$$0.6f < -r_8 < 1.1f \quad (2)$$

$$0.1 < n_4 - n_5 < 0.2, \ 24 < v_5 - v_4 < 35 \quad (3)$$

$$-\frac{0.85}{f} < \frac{2}{(n_2 + n_3)f_{23}} + \frac{2}{(n_4 + n_5)f_{45}} < -\frac{0.65}{f} \quad (4)$$

$$1.5 < r5/r4 < 1.87, \ d_4 < 0.05f \quad (5)$$

$$0.16f < d_3 + d_4 + d_5 < 0.19f, \ 0.14f < d_7 + d_8 < 0.17f \quad (6)$$

$$1.7 < n_1, n_2, n_3, n_4 < 1.86 \quad (7)$$

$$1.6 < n_5, n_6, n_7 < 1.82 \quad (8)$$

$$40 < v_5, v_6, v_7 < 60 \quad (9)$$

To attain an object of the present invention, i.e., to obtain a compact lens system, the overall length of the lens system should be made short and, as a result, the intensity of light in the marginal portion becomes high. For lens systems of F1.2 class, however, the overall length is liable to become long because the aperture ratio is large. Moreover, to obtain favourable symmetry of coma, the airspace between the lens surfaces just in front and rear of the stop cannot be made very small. Therefore, to obtain a compact large-aperture lens system for which the intensity of light in the marginal portion is high, it is necessary to satisfy the condition (1) $L/f < 1$.

For modified Gauss type lens systems like the lens system according to the present invention, the ratio between the back focal length $f_B$ and $f$, i.e., $f_B/f$, is usually about 0.7 at the maximum. To make the ratio still larger up to about 0.75, it is necessary to increase asymmetry of the front lens group arranged in front of the stop and the rear lens group arranged in rear of the stop. As a result, unfavourable influence will be caused, for example, symmetry of coma will become unfavourable, chromatic aberration will be undercorrected and so forth. In the present invention, undercorrection of chromatic aberration is prevented by arranging so that the only cemented surface $r_8$ has negative power. Besides, to obtain favourable symmetry of coma, the cemented surface $r_8$ is arranged to be concave toward the object side. The condition (2) is to define the abovementioned cemented surface $r_8$. If it becomes $0.6f < -r_8$ in the condition (2), chromatic aberration of the lens system will be undercorrected even when materials of respective lenses constituting the fourth lens components are selected to satisfy the condition (3). If it becomes $-r_8 < 1.1f$, symmetry of coma will become unfavourable.

The condition (3) defines the materials of respective lenses constituting the fourth lens component which is a cemented doublet. When the materials of those lenses are selected within the ranges shown by the condition (3), the cemented surface of the fourth lens component serves as a concave surface in cooperation with the condition (2) and, as a result, chromatic aberration is corrected favourably and, moreover, favourable symmetry of coma is obtained.

When it is attempted to attain another object of the present invention, i.e., to make $f_B$ long and to increase the ratio $f_B/f$ between $f_B$ and $f$ up to 0.75, symmetry of Gauss type lens system will be lost. Moreover, curvature of field will become large and it becomes impossible to obtain a favourable image over the whole effective field. For Gauss type lens systems, Petzval's sum generally becomes a large positive value and the image plane becomes concave toward the object side. In the present invention, the second and third lens components constitute one lens in combination with each other and it is so arranged that the second and third lens components form a negative lens as a whole. Besides, the fourth lens component is also arranged as a negative lens. By arranging so that the component $$\frac{2}{(n_2 + n_3)f_{23}} + \frac{2}{(n_4 + n_5)f_{45}},$$

which contributes to make Petzval's sum negative, becomes smaller than the upper limit of the condition (4), Petzval's sum of the lens system as a whole is made small and curvature of field is also made small. If, however, the above-mentioned component becomes smaller than the lower limit of the condition (4), spherical aberration will become unfavourable.

In the present invention, the radius of curvature $r_4$ of the surface on the image side of the second lens component and radius of curvature $r_5$ of the surface on the object side of the third lens component are selected as defined by the condition (5) so that the air lens (an airspace between lenses which serves like a lens) between the second and third lens components has negative power. Besides, to satisfy the condition (4), it is necessary to arrange so that the combination of the second and third lens components serves as a negative lens of strong negative power. Therefore, it is required to make the value of $r_5/r_4$ larger than 1.5 as shown by the condition (5). In Gauss type lens systems, the second and third lens components are generally cemented together to form a cemented doublet and its cemented surface is effective for correction of chromatic aberration. If, therefore, $r_5/r_4$ exceeds the upper limit in the condition (5) and the airspace $d_4$ between the second and third lens components becomes larger than the range defined by the condition (5) as a result of the above, correcting effect of surfaces $r_4$ and $r_5$ for chromatic aberration becomes considerably weak and it becomes very difficult to favourably correct chromatic aberration by the other lenses.

The condition (6) is required for the purpose of materializing a compact lens system of F1.2 class. In the lens system, thicknesses $d_1$, $d_{10}$ and $d_{12}$ of the first, fifth and sixth lens components cannot be made small because effective diameters of these lens components are predetermined. Besides, the airspace $d_6$ between the third and fourth lens components cannot be made smaller than about $(r6 + r7/2)$ because symmetry of coma will otherwise become unfavourable. Therefore, in the present invention, the other d values are made small, i.e., $d_3 + d_4 + d_5 < 0.19f$ and $d_7 + d_8 < 0.17f$, so that the overall length of the lens system becomes short and the intensity of light in the marginal portion becomes satisfactorily high. If, however, the above values become smaller than the lower limits of the condition (6), i.e., if it becomes $0.16f < d_3 + d_4 + d_5$ or $0.14f < d_7 + d_8$, Petzval's sum becomes large and curvature of field also increases.

The condition (7) is required for the purpose of making the curvature of field small. That is, by arranging so that refractive indices of the first, second and third lens components and of the lens on the object side of the fourth lens component become respectively higher than the lower limit of the condition (7), absolute values of radii of curvature of these lenses are made large so that Petzval's sum becomes small and curvature of field also becomes small. If, however, any of the above-mentioned refractive indices becomes higher than the upper limit of the condition (7), it is impossible to obtain such material for that lens with which Abbe's number becomes a reasonable value.

Due to the same reason as above, it is prefereable to make refractive indices of the lens on the image side of the fourth lens component and of the fifth and sixth lens components as high as possible. The present invention, however, has an object to make $f_B$ long up to about 0.75f. To attain this object, the rear lens group arranged in rear of the stop should have strong refractive power and, therefore, there is a tendency that chromatic aberration caused in the rear lens group becomes large. To prevent the above, Abbe's number $\nu_5$ of the lens on the image side of the fourth lens component and Abbe's numbers $\nu_6$ and $\nu_7$ of the fifth and sixth lens components are made larger than 40 as shown in the condition (9) so that chromatic aberration is minimized. Therefore, materials of these lenses necessarily become such materials for which refractive indices are somewhat low. Due to the above-mentioned reason, refrative indices $n_5$, $n_6$ and $n_7$ should be higher than 1.6 as shown in the condition (8). If, however, $n_5$, $n_6$ or $n_7$ becomes higher than 1.82, it becomes difficult to obtain a material of adequate Abbe's number for that lens. In the same way, if Abbe's number $\nu_5$, $\nu_6$ or $\nu_7$ in the condition (9) becomes larger than 60, it becomes impossible to obtain such material for that lens for which the refractive index satisfies the condition (8) and at the same time is reasonable for making a lens.

DETAILED DESCRIPTION OF THE PREFERRED EMBODIMENTS

Preferred embodiments of the compact large-aperture photoraphic lens system with long back focal length according to the present invention are as shown below.

Embodiment 1:
$f = 100$, F 1.2, $2\omega = 46°$, $f_B = 75.2$ $r1 = 90.851$
$d1 = 10.61$  $n1 = 1.834$  $\nu1 = 37.19$ -continued

Embodiment 1:

r2 = 546.619
 d2 = 0.19
r3 = 55.369
 d3 = 11.25    n2 = 1.8044    ν2 = 39.62
r4 = 95.056
 d4 = 4
r5 = 158.146
 d5 = 2.61     n3 = 1.7847    ν3 = 26.22
r6 = 36.590
 d6 = 34.02
r7 = −33.822
 d7 = 2.88     n4 = 1.84666   ν4 = 23.9
r8 = −82.077
 d8 = 13.17    n5 = 1.734     ν5 = 51.52
r9 = −48.055
 d9 = 0.19
r10 = −285.232
 d10 = 11.72   n6 = 1.734     ν6 = 51.52
r11 = −64.922
 d11 = 0.19
r12 = 157.079
 d12 = 6.73    n7 = 1.734     ν7 = 51.52
r13 = −910.494

L = Σd = 97.56,  f23 = −126.919,  f45 = −200.167

$$\frac{2}{(n2 + n3) f23} + \frac{2}{(n4 + n5) f45} = -0.00718$$

r5/r4 = 1.664

---

Embodiment 2:

f = 100,  F 1.2,  2ω = 46°,  f$_B$ = 74.5 r1 = 90.090
 d1 = 10.6     n1 = 1.834     ν1 = 37.19
r2 = 586.320
 d2 = 0.2
r3 = 54.675
 d3 = 11.92    n2 = 1.8044    ν2 = 39.62
r4 = 91.779
 d4 = 2.79
r5 = 156.838
 d5 = 3.08     n3 = 1.7847    ν3 = 26.22
r6 = 35.379
 d6 = 33.99
r7 = −33.098
 d7 = 2.88     n4 = 1.84666   ν4 = 23.9
r8 = −72.065
 d8 = 12.88    n5 = 1.734     ν5 = 51.52
r9 = −48.356
 d9 = 0.2
r10 = −244.533
 d10 = 11.69   n6 = 1.72916   ν6 = 54.7
r11 = −63.601
 d11 = 0.2
r12 = 157.708
 d12 = 6.73    n7 = 1.72916   ν7 = 54.7
r13 = −712.917

L = Σd = 97.14,  f23 = −125.76,  f45 = −202.40

$$\frac{2}{(n2 + n3)f23} + \frac{2}{(n4 + n5)f45} = -0.00719$$

r5/r4 = 1.709

---

Embodiment 3:

f = 100,  F 1.2, 2ω = 46°,  f$_B$ = 74.42 r1 = 92.057
 d1 = 10.6     n1 = 1.834     ν1 = 37.19
r2 = 624.402
 d2 = 0.2
r3 = 54.988
 d3 = 11.92    n2 = 1.8044    ν2 = 39.62
r4 = 93.467
 d4 = 2.79
r5 = 159.627
 d5 = 3.54     n3 = 1.7847    ν3 = 26.22
r6 = 35.479
 d6 = 34.00
r7 = −33.921
 d7 = 2.88     n4 = 1.84666   ν4 = 23.9
r8 = −71.957

---

Embodiment 3:

d8 = 12.88    n5 = 1.72916   ν5 = 54.7
r9 = −48.367
 d9 = 0.2
r10 = −245.942
 d10 = 11.69   n6 = 1.72916   ν6 = 54.7
r11 = −63.647
 d11 = 0.2
r12 = 159.177
 d12 = 6.73    n7 = 1.72916   ν7 = 54.7
r13 = −639.108

L = Σd = 97.6,  f23 = −127.156,  f45 = −200.50

$$\frac{2}{(n2 + n3)f23} + \frac{2}{(n4 + n5)f45} = -0.00717$$

r5/r4 = 1.708

---

Embodiment 4:

f = 100,  F 1.2,  2ω = 46°,  f$_B$ = 74.4 r1 = 87.472
 d1 = 10.6     n1 = 1.834     ν1 = 37.19
r2 = 480.599
 d2 = 0.2
r3 = 55.420
 d3 = 11.22    n2 = 1.8061    ν2 = 40.92
r4 = 94.348
 d4 = 4.01
r5 = 152.809
 d5 = 2.59     n3 = 1.7847    ν3 = 26.22
r6 = 35.214
 d6 = 34.05
r7 = −33.757
 d7 = 2.88     n4 = 1.84666   ν4 = 23.9
r8 = −88.400
 d8 = 13.08    n5 = 1.734     ν5 = 51.52
r9 = −48.424
 d9 = 0.2
r10 = −257.195
 d10 = 11.70   n6 = 1.735     ν6 = 49.82
r11 = −63.662
 d11 = 0.2
r12 = 153.235
 d12 = 6.72    n7 = 1.735     ν7 = 49.82
r13 = −792.247

L = Σd = 97.42,  f23 = −125.074,  f45 = −189.085

$$\frac{2}{(n2 + n3)f23} + \frac{2}{(n4 + n5)f45} = -0.0074$$

r5/r4 = 1.62

---

Embodiment 5:

f = 100,  F 1.2,  f$_B$ = 74.62 r1 = 82.84
 d1 = 10.19    n1 = 1.83481   ν1 = 42.82
r2 = 375.812
 d2 = 0.19
r3 = 54.248
 d3 = 10.71    n2 = 1.834     ν2 = 37.19
r4 = 81.369
 d4 = 2.88
r5 = 122.931
 d5 = 3.25     n3 = 1.74      ν3 = 28.29
r6 = 34.208
 d6 = 34.04
r7 = −32.638
 d7 = 3.17     n4 = 1.84666   ν4 = 23.9
r8 = −101.792
 d8 = 11.54    n5 = 1.6968    ν5 = 55.52
r9 = −46.762
 d9 = 0.19
r10 = −183.948
 d10 = 11.15   n6 = 1.7725    ν6 = 49.60
r11 = −58.952
 d11 = 0.19
r12 = 169.800
 d12 = 5.77    n7 = 1.79952   ν7 = 42.24
r13 = −699.104

L = Σd = 93.29,  f23 = −134.5,  f45 = −157.1

-continued

Embodiment 5:

$$\frac{2}{(n_2 + n_3)f_{23}} + \frac{2}{(n_4 + n_5)f_{45}} = -\frac{0.775}{f}$$

Petzval's sum = 0.158

Embodiment 6:

f = 100, F 1.2, $f_B$ = 74.62

| | | |
|---|---|---|
| r1 = 82.171 | | |
| d1 = 10.22 | n1 = 1.83481 | ν1 = 42.82 |
| r2 = 379.002 | | |
| d2 = 0.19 | | |
| r3 = 54.883 | | |
| d3 = 10.78 | n2 = 1.834 | ν = 37.19 |
| r4 = 81.410 | | |
| d4 = 2.88 | | |
| r5 = 126.319 | | |
| d5 = 3.29 | n3 = 1.72825 | ν3 = 28.46 |
| r6 = 34.304 | | |
| d6 = 33.95 | | |
| r7 = −32.819 | | |
| d7 = 3.11 | n4 = 1.84666 | ν4 = 23.9 |
| r8 = −105.769 | | |
| d8 = 11.49 | n5 = 1.6779 | ν5 = 55.33 |
| r9 = −47.662 | | |
| d9 = 0.19 | | |
| r10 = −163.417 | | |
| d10 = 10.95 | n6 = 1.7725 | ν6 = 49.6 |
| r11 = −57.517 | | |
| d11 = 0.19 | | |
| r12 = 174.050 | | |
| d12 = 5.82 | n7 = 1.79952 | ν7 = 42.24 |
| r13 = −435.498 | | |

Σd = 93.07   f23 = −133.2,   f45 = −144.0

$$\frac{2}{(n_2 + n_3)f_{23}} + \frac{2}{(n_4 + n_5)f_{45}} = -\frac{0.816}{f}$$

Petzval's sum = 0.159

In the above-mentioned respective embodiments, reference symbols r1 through r13 respectively represent radii of curvature of respective lens surfaces, reference symbols d1 through d12 respectively represent thicknesses of respective lenses and airspaces between respective lenses, reference symbols n1 through n7 respectively represent refractive indices of respective lenses and reference symbols ν1 through ν7 respectively represent Abbe's numbers of respective lenses.

Besides, Seidel's coefficients of aberrations for Embodiment 2 are as shown below.

| | Spherical aberration | Astigmatism | Coma | Distortion | Petzval |
|---|---|---|---|---|---|
| 1 | 0.3391 | 0.0349 | 0.1087 | 0.1730 | 0.5048 |
| 2 | 0.1966 | 0.9346 | −0.4254 | −1.8829 | −0.0776 |
| 3 | −0.1005 | −0.0377 | −0.0615 | 0.4759 | 0.8154 |
| 4 | 0.2388 | 1.4771 | −0.5939 | −2.4658 | −0.4857 |
| 5 | −0.6738 | −1.9629 | 1.1500 | 2.8717 | 0.2803 |
| 6 | −0.8058 | −0.1332 | −0.3276 | −0.5593 | −1.2428 |
| 7 | −1.9118 | −0.2357 | 0.6713 | 0.5576 | −1.3521 |
| 8 | −0.0015 | −0.0235 | 0.0059 | −0.1008 | 0.0488 |
| 9 | 0.5060 | 0.0602 | −0.1746 | −0.3227 | 0.8754 |
| 10 | −0.0002 | −0.0053 | 0.0009 | 1.0496 | −0.1724 |
| 11 | 1.6908 | 0.0028 | −0.0687 | −0.0271 | 0.6630 |
| 12 | −0.0009 | −0.3026 | 0.0167 | 0.6366 | 0.2674 |
| 13 | 0.6271 | 0.1402 | −0.2965 | −0.0942 | 0.0591 |
| Sum | 0.1010 | −0.0511 | 0.0055 | 0.3114 | 0.1836 |

As explained in the above, the photographic lens system according to the present invention is compact in size and, moreover, its back focal length is long, the intensity of light in the marginal portion is satisfactorily high and aberrations are corrected favourably. This is evident also from numerical values and aberration curves of respective embodiments and also from Seidel's coefficients of aberrations for Embodiment 2 which are shown for example.

I claim:

1. A compact large-aperture photographic lens system with long back focal length comprising a first, second, third, fourth fifth and sixth lens components, said first lens components being a positive meniscus lens, said second lens component being a positive meniscus lens, said third lens component being a negative meniscus lens, said fourth lens component being a cemented meniscus doublet, said fifth lens component being positive meniscus lens, said sixth lens component being a positive lens, said compact large-aperture photographic lens system with long back focal length satisfying the following conditions:

$$(L/f) < 1 \ (L = \Sigma d) \tag{1}$$

$$0.6f < -r_8 < 1.1f \tag{2}$$

$$0.1 < n_4 - n_5 < 0.2, \ 24 < \nu_5 - \nu_4 < 35 \tag{3}$$

$$-\frac{0.85}{f} < \frac{2}{(n_2 + n_3)f_{23}} + \frac{2}{(n_4 + n_5)f_{45}} < -\frac{0.65}{f} \tag{4}$$

$$1.5 < r_5/r_4 < 1.87, \ d_4 < 0.05f \tag{5}$$

$$0.16f < d_3 + d_4 + d_5 < 0.19f, \ 0.14f < d_7 + d_8 < 0.17f \tag{6}$$

$$1.7 < n_1, n_2, n_3, n_4 < 1.86 \tag{7}$$

$$1.6 < n_5, n_6, n_7 < 1.82 \tag{8}$$

$$40 < \nu_5, \nu_5, \nu_7 < 60 \tag{9}$$

Wherein reference symbol L represents the overall length of the lens system, reference symbol $r_4$ represents the radius of curvature of the surface on the image side of the second lens component, reference symbol $r_5$ represents the radius of curvature of the surface on the object side of the third lens component, reference symbol $r_8$ represents the radius of curvature of the cemented surface of the fourth lens component, reference symbols $d_3$ and $d_5$ respectively represent thicknesses of the second and third lens components, reference symbols $d_7$ and $d_8$ respectively represent thicknesses of respective lenses constituting the fourth lens component, reference symbol $d_4$ represents the airspace between the second and third lens components, reference symbols n1 through n7 respectively represent refractive indices of respective lenses, reference symbols ν4 and ν5 respectively represent Abbe's numbers of respective lenses constituting the fourth lens component, reference symbols ν6 and ν7 respectively represent Abbe's numbers of the fifth and sixth lens components, reference symbol $f$ represents the focal length of the lens system as a whose, reference symbol $f_{23}$ represents the total focal length of the second and third lens components and reference symbol $f_{45}$ represents the focal length of the fourth lens component.

2. A compact large-aperture photographic lens system with long back focal length according to claim 1, in which said compact large-aperture photographic lens system with long back focal length has the following numerical data:

f = 100, F 1.2, 2ω = 46°, $f_B$ = 75.2 r₁ = 90.851

-continued

| | | |
|---|---|---|
| d1 = 10.61 | n1 = 1.834 | ν1 = 37.19 |
| r2 = 546.619 | | |
| d2 = 0.19 | | |
| r3 = 55.369 | | |
| d3 = 11.25 | n2 = 1.8044 | ν2 = 39.62 |
| r4 = 95.056 | | |
| d4 = 4 | | |
| r5 = 158.146 | | |
| d5 = 2.61 | n3 = 1.7847 | ν3 = 26.22 |
| r6 = 36.590 | | |
| d6 = 34.02 | | |
| r7 = −33.822 | | |
| d7 = 2.88 | n4 = 1.84666 | ν4 = 23.9 |
| r8 = −82.077 | | |
| d8 = 13.17 | n5 = 1.734 | ν5 = 51.52 |
| r9 = −48.055 | | |
| d9 = 0.19 | | |
| r10 = −285.232 | | |
| d10 = 11.72 | n6 = 1.734 | ν6 = 51.52 |
| r11 = −64.922 | | |
| d11 = 0.19 | | |
| r12 = 157.079 | | |
| d12 = 6.73 | n7 = 1.734 | ν7 = 51.52 |
| r13 = −910.494 | | |
| L = Σd = 97.56, f23 = −126.919, f45 = −200.167 | | |

$$\frac{2}{(n2 + n3)f23} + \frac{2}{(n4 + n5)f45} = -0.00718$$

$$r5/r4 = 1.664$$

Wherein, reference symbols r1 through r13 respectively represent radii of curvature of respective lens surfaces, reference symbols d1 through d12 respectively represent thicknesses of respective lenses and airspaces between respective lenses, reference symbols n1 through n7 respectively represent refractive indices of respective lenses and reference symbols ν1 through ν7 respectively represent Abbe's numbers of respective lenses.

3. A compact large-aperture photographic lens system with long back focal length according claim 1, in which said compact large-aperture photographic lens system with long back focal length has the following numerical data:

| f = 100, F 1.2, 2ω = 46°, $f_B$ = 74.5 | | |
|---|---|---|
| r1 = 90.090 | | |
| d1 = 10.6 | n1 = 1.834 | ν1 = 37.19 |
| r2 = 586.320 | | |
| d2 = 0.2 | | |
| r3 = 54.675 | | |
| d3 = 11.92 | n2 = 1.8044 | ν2 = 39.62 |
| r4 = 91.779 | | |
| d4 = 2.79 | | |
| r5 = 156.838 | | |
| d5 = 3.08 | n3 = 1.7847 | ν3 = 26.22 |
| r6 = 35.379 | | |
| d6 = 33.99 | | |
| r7 = −33.908 | | |
| d7 = 2.88 | n4 = 1.84666 | ν4 = 23.9 |
| r8 = −72.065 | | |
| d8 = 12.88 | n5 = 1.734 | ν5 = 51.52 |
| r9 = −48.356 | | |
| d9 = 0.2 | | |
| r10 = −244.533 | | |
| d10 = 11.69 | n6 = 1.72916 | ν6 = 54.7 |
| r11 = −63.601 | | |
| d11 = 0.2 | | |
| r12 = 157.708 | | |
| d12 = 6.73 | n7 = 1.72916 | ν7 = 54.7 |
| r13 = 712.917 | | |
| L = Σd = 97.14, f23 = −125.76, f45 = −202.40 | | |

$$\frac{2}{(n2 + n3)f23} + \frac{2}{(n4 + n5)f45} = -0.00719$$

$$r5/r4 = 1.709$$

Wherein, reference symbols r1 through r13 respectively represent radii of curvature of respective lens surfaces, reference symbols d1 through d12 respectively represent thicknesses of respective lenses and airspaces between respective lenses, reference symbols n1 through n7 respectively represent refractive indices of respective lenses and reference symbols ν1 through ν7 respectively represent Abbe's numbers of respective lenses.

4. A compact large-aperture photographic lens system with long back focal length according to claim 1, in which said compact large-aperture photographic lens system with long back focal length has the following numerical data:

| f = 100, F 1.2, 2ω = 46°, $f_B$ = 74.42 | | |
|---|---|---|
| r1 = 92.507 | | |
| d1 = 10.6 | n1 = 1.834 | ν1 = 37.19 |
| r2 = 624.402 | | |
| d2 = 0.2 | | |
| r3 = 54.988 | | |
| d3 = 11.92 | n2 = 1.8044 | ν2 = 39.62 |
| r4 = 93.467 | | |
| d4 = 2.79 | | |
| r5 = 159.627 | | |
| d5 = 3.54 | n3 = 1.7847 | ν3 = 26.22 |
| r6 = 35.479 | | |
| d6 = 34.00 | | |
| r7 = −33.921 | | |
| d7 = 2.88 | n4 = 1.84666 | ν4 = 23.9 |
| r8 = −71.957 | | |
| d8 = 12.88 | n5 = 1.72916 | ν5 = 54.7 |
| r9 = −48.367 | | |
| d9 = 0.2 | | |
| r10 = −245.942 | | |
| d10 = 11.69 | n6 = 1.72916 | ν6 = 54.7 |
| r11 = −63.647 | | |
| d11 = 0.2 | | |
| r12 = 159.177 | | |
| d12 = 6.73 | n7 = 1.72916 | ν7 = 54.7 |
| r13 = −639.108 | | |
| L = Σd = 97.6, f23 = −127.156, f45 = −200.50 | | |

$$\frac{2}{(n2 + n3)f23} + \frac{2}{(n4 + n5)f45} = -0.00717$$

$$r5/r4 = 1.708$$

Wherein, reference symbols r1 through r13 respectively represent radii of curvature of respective lens surfaces, reference symbols d1 through d12 respectively represent thicknesses of respective lenses and airspaces between respective lenses, reference symbols n1 through n7 respectively represent refractive indices of respective lenses and reference symbols ν1 through ν7 respectively represent Abbe's numbers of respective lenses.

5. A compact large-aperture photographic lens system with long back focal length according to claim 1, in which said compact large-aperture photographic lens system with long back focal length has the following numerical data:

| F = 100, F 1.2, 2ω = 46°, $f_B$ = 74.4 | | |
|---|---|---|
| r1 = 87.472 | | |
| d1 = 10.6 | n1 = 1.834 | ν1 = 37.19 |
| r2 = 480.599 | | |
| d2 = 0.2 | | |
| r3 = 55.420 | | |
| d3 = 11.22 | n2 = 1.8061 | ν2 = 40.92 |
| r4 = 94.348 | | |
| d4 = 4.01 | | |
| r5 = 152.809 | | |
| d5 = 2.59 | n3 = 1.7847 | ν3 = 26.22 |
| r6 = 35.214 | | |
| d6 = 34.05 | | |
| r7 = −33.757 | | |
| d7 = 2.88 | n4 = 1.84666 | ν4 = 23.9 |
| r8 = −88.400 | | |
| d8 = 13.08 | n5 = 1.734 | ν5 = 51.52 |
| r9 = −48.424 | | |
| d9 = 0.2 | | |
| r10 = −257.195 | | |
| d10 = 11.70 | n6 = 1.735 | ν6 = 49.82 |
| r11 = −63.662 | | |

-continued

```
d11 = 0.2
r12 = 153.235
  d12 = 6.72      n7 = 1.735    ν7 = 49.82
r13 = −792.247
```

$$L = \Sigma d = 97.42, \quad f23 = -125.074, \quad f45 = -189.085$$

$$\frac{2}{(n2 + n3)f23} + \frac{2}{(n4 + n5)f45} = -0.0074$$

$$r5/r4 = 1.62$$

Wherein, reference symbols $r1$ through $r13$ respectively represent radii of curvature of respective lens surfaces, reference symbols $d1$ through $d12$ respectively represent thicknesses of respective lenses and airspaces between respective lenses, reference symbols $n1$ through $n7$ respectively represent refractive indices of respective lenses and reference symbols $\nu1$ through $\nu7$ respectively represent Abbe's numbers of respective lenses.

6. A compact large-aperture photographic lens system with long back focal length according to claim 1, in which said compact large-aperture photographic lens system with long back focal length has the following numerical data:

```
           f = 100,  F 1.2   f_B = 74.62 r1 = 82.84
  d1 = 10.19      n1 = 1.83481    ν1 = 42.82
r2 = 375.812
  d2 = 0.19
r3 = 54.248
  d3 = 10.71      n2 = 1.834      ν2 = 37.19
r4 = 81.369
  d4 = 2.88
r5 = 122.931
  d5 = 3.25       n3 = 1.74       ν3 = 28.29
r6 = 34.208
  d6 = 34.04
r7 = −32.638
  d7 = 3.17       n4 = 1.84666    ν4 = 23.9
r8 = −101.792
  d8 = 11.54      n5 = 1.6968     ν5 = 55.52
r9 = −46.762
  d9 = 0.19
r10 = −183.948
  d10 = 11.15     n6 = 1.7725     ν6 = 49.60
r11 = −58.952
  d11 = 0.19
r12 = 169.800
  d12 = 5.77      n7 = 1.79952    ν7 = 42.24
r13 = −699.104
            L = Σd = 93.29
       f23 = −134.5,  f45 = −157.1
```

-continued $$\frac{2}{(n2 + n3)f23} + \frac{2}{(n4 + n5)f45} = -\frac{0.775}{f}$$

Petzval's sum = 0.158

Wherein, reference symbols $r1$ through $r13$ respectively respresent radii of curvature of respective lens surfaces, reference symbols $d1$ through $d12$ respectively represent thicknesses of respective lenses and airspaces between respective lenses, reference symbols $n1$ through $n7$ respectively represent refractive indices of respective lenses and reference symbols $\nu1$ through $\nu7$ respectively represent Abbe's numbers of respective lenses.

7. A compact large-aperture photographic lens system with long back focal length according to claim 1, in which said compact large-aperture photographic lens system with long back focal length has the following numerical data:

```
           f = 100,  F 1.2,  f_B = 74.62 r1 = 82.171
  d1 = 10.22      n1 = 1.83481    ν1 = 42.82
r2 = 379.002
  d2 = 0.19
r3 = 54.883
  d3 = 10.78      n2 = 1.834      ν2 = 37.19
r4 = 81.410
  d4 = 2.88
r5 = 126.319
  d5 = 3.29       n3 = 1.72825    ν3 = 28.46
r6 = 34.304
  d6 = 33.95
r7 = −32.819
  d7 = 3.11       n4 = 1.84666    ν4 = 23.9
r8 = −105.769
  d8 = 11.49      n5 = 1.6779     ν5 = 55.33
r9 = −47.662
  d9 = 0.19
r10 = −163.417
  d10 = 10.95     n6 = 1.7725     ν6 = 49.6
r11 = −57.517
  d11 = 0.19
r12 = 174.050
  d12 = 5.82      n7 = 1.79952    ν7 = 42.24
r13 = −435.498
            Σd = 93.07
       f23 = −133.2,  f45 = −144.0
```

Wherein, reference symbols $r1$ through $r13$ respectively represent radii of curvature of respective lens surfaces, reference symbols $d1$ through $d12$ respectively represent thicknesses of respective lenses and airspaces between respective lenses, reference symbols $n1$ through $n7$ respectively represent refractive indices of respective lenses and reference symbols $\nu1$ through $\nu7$ respectively represent Abbe's numbers of respective lenses.

* * * * *